US010776132B1

(12) United States Patent
Joshi et al.

(10) Patent No.: US 10,776,132 B1
(45) Date of Patent: Sep. 15, 2020

(54) SYSTEM AND METHOD FOR PREBOOT DEVICE DRIVER PROVISIONING FOR REMOTELY-STAGED OPERATING SYSTEM

(71) Applicant: DELL PRODUCTS, LP, Round Rock, TX (US)

(72) Inventors: Anand P. Joshi, Round Rock, TX (US); Purushothama R. Malluru, Round Rock, TX (US); Ibrahim Sayyed, Georgetown, TX (US); Steven A. Downum, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/453,045

(22) Filed: Jun. 26, 2019

(51) Int. Cl.
| *G06F 3/00* | (2006.01) |
| *G06F 9/4401* | (2018.01) |
| *G06F 11/14* | (2006.01) |
| *G06F 9/50* | (2006.01) |
| *G06F 9/30* | (2018.01) |
| *G06F 9/54* | (2006.01) |

(52) U.S. Cl.
CPC .......... *G06F 9/4411* (2013.01); *G06F 9/3017* (2013.01); *G06F 9/4406* (2013.01); *G06F 9/5022* (2013.01); *G06F 9/54* (2013.01); *G06F 11/1471* (2013.01)

(58) Field of Classification Search
CPC ....................................................... G06F 9/54
USPC ........................................................ 719/310
See application file for complete search history.

(56) References Cited

U.S. PATENT DOCUMENTS

| 9,436,828 | B2 | 9/2016 | Anson et al. | |
| 2001/0044873 | A1* | 11/2001 | Wilson | G11B 20/1883 711/4 |
| 2003/0023839 | A1* | 1/2003 | Burkhardt | G06F 8/63 713/1 |
| 2003/0065913 | A1* | 4/2003 | Cepulis | G06F 9/4406 713/1 |
| 2012/0032945 | A1* | 2/2012 | Dare | G06F 3/0481 345/418 |
| 2012/0204019 | A1 | 8/2012 | Joshi et al. | |
| 2015/0012656 | A1* | 1/2015 | Phillips | H04L 47/26 709/226 |

(Continued)

OTHER PUBLICATIONS

Daniel Devers,Automated Operating System Installation Remote Installation Services (Year: 2006).*

*Primary Examiner* — Lechi Truong
(74) *Attorney, Agent, or Firm* — Larson Newman, LLP

(57) ABSTRACT

A method allocates a dynamic memory disk located in a pre-boot environment and accessible in the pre-boot environment and in an OS runtime environment. The method may transmit a request to a distribution system for an OS base image and a device driver that includes an identifier of the information handling system. The method receives a response including instructions on how to download the OS base image and the device driver associated with the identifier of the information handling system. The OS base image is modified to include a virtual device driver and an OS deployment agent. The method stores the OS base image and the device driver at the dynamic memory disk. The method loads the OS base image that includes installing an OS in the runtime environment. Then the dynamic memory disk may be mounted by the virtual device driver that may be installed by the OS.

20 Claims, 5 Drawing Sheets

(56) References Cited

U.S. PATENT DOCUMENTS

2016/0048694 A1    2/2016  Martinez et al.
2017/0093971 A1*   3/2017  Feinberg ............ H04L 67/1095

* cited by examiner

US 10,776,132 B1

SYSTEM AND METHOD FOR PREBOOT DEVICE DRIVER PROVISIONING FOR REMOTELY-STAGED OPERATING SYSTEM

FIELD OF THE DISCLOSURE

This disclosure generally relates to information handling systems, and more particularly relates to provisioning pre-boot device drivers for a remotely-staged operating system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in the information handling systems allow for the information handling systems to be general or configured for a specific user or specific use such as financial transaction processing, reservations, enterprise data storage, or global communications. In addition, the information handling systems may include a variety of hardware and software resources that may be configured to process, store, and communicate information and may include one or more computer systems, data storage systems, and networking systems.

SUMMARY

A method creates a dynamic memory disk located in a pre-boot environment and accessible in the pre-boot environment and in an operating system (OS) runtime environment. The method may transmit a request to a distribution system for an OS base image and a device driver, wherein the request to the distribution system includes an identifier of the information handling system. The method receives a response from the distribution system, the response including instructions on how to download the OS base image and the device driver associated with the identifier of the information handling system, wherein the OS base image is modified to include a virtual device driver and an OS deployment agent. The method downloads the OS base image and the device driver based on the instructions, and stores the OS base image and the device drivers in the dynamic memory disk. The method loads the OS base image, wherein loading the OS includes installing drivers from the dynamic disk created in the pre-boot environment into the OS. A virtual device driver is installed by the OS. The driver locates the pre-boot dynamic disk and mounts it to the OS so that the contents of the dynamic disk are visible to OS processes.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Figure 1:
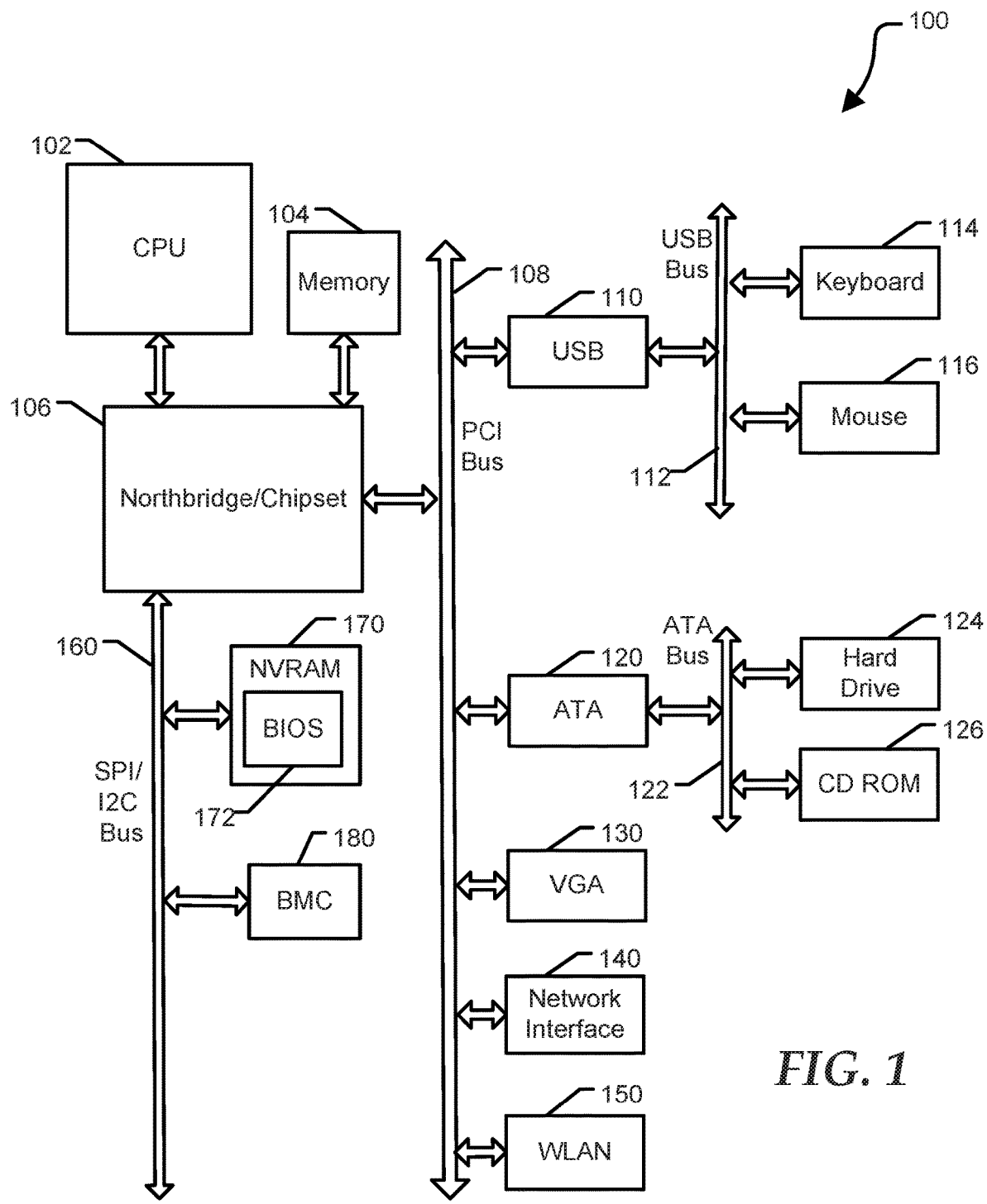
FIG. 1 is a block diagram of a generalized information handling system.

FIG. 1 illustrates an information handling system 100 including a processor 102, a memory 104, a northbridge/chipset 106, a PCI bus 108, a universal serial bus (USB) controller 110, a USB 112, a keyboard device controller 114, a mouse device controller 116, an ATA bus controller 120, an ATA bus 122, a hard drive device controller 124, a compact disk read only memory (CD ROM) device controller 126, a video graphics array (VGA) device controller 130, a network interface controller (NIC) 140, a wireless local area network (WLAN) controller 150, a serial peripheral interface (SPI) bus 160, a non-volatile random-access memory (NVRAM) 170 for storing BIOS 172, and a baseboard management controller (BMC) 180. BMC 180 can be referred to as a service processor or embedded controller (EC).

Capabilities and functions provided by BMC 180 can vary considerably based on the type of information handling system. For example, the term baseboard management system is often used to describe an embedded processor included at a server, while an embedded controller is more likely to be found in a consumer-level device. As disclosed herein, BMC 180 represents a processing device different from CPU 102, which provides various management functions for information handling system 100. For example, an embedded controller may be responsible for power management, cooling management, and the like. An embedded controller included at a data storage system can be referred to as a storage enclosure processor.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Information handling system 100 can include additional processors that are configured to provide localized or specific control functions, such as a battery management controller. Bus 160 can include one or more busses, including an SPI bus, an I2C bus, a system management bus (SMBUS), a power management bus (PMBUS), and the like. BMC 180 can be configured to provide out-of-band access to devices at information handling system 100. As used herein, out-of-band access herein refers to operations performed prior to execution of BIOS 172 by processor 102 to initialize operation of information handling system 100.

BIOS 172 can be referred to as a firmware image, and the term BIOS is herein used interchangeably with the term firmware image, or simply firmware. BIOS 172 includes instructions executable by CPU 102 to initialize and test the hardware components of information handling system 100, and to load a boot loader or an OS from a mass storage device. BIOS 172 additionally provides an abstraction layer for the hardware, i.e. a consistent way for application programs and OS to interact with the keyboard, display, and other input/output devices. When power is first applied to information handling system 100a, the system begins a sequence of initialization procedures. During the initialization sequence, also referred to as a boot sequence, components of the information handling system are configured and enabled for operation, and installation of device drivers. Device drivers provide an interface through which other components of information handling system 100 can communicate with a corresponding device.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. For example, portions of northbridge/chipset 106 can be integrated within CPU 102. Additional components of information handling system 100 can include one or more storage devices that can store machine-executable code, one or more communications ports for communicating with external devices, and various input and output (I/O) devices, such as a keyboard, a mouse, and a video display. For example, device controller 130 may provide data to a display device 190 to visually present the information to an individual associated with information handling system 100. An example of information handling system 100 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 100 can include a set of instructions that can be executed to cause the information handling system to perform any one or more of the methods or computer based functions disclosed herein. Information handling system 100 may operate as a standalone device or may be connected to other computer systems or peripheral devices, such as by a network.

In a networked deployment, information handling system 100 may operate in the capacity of a server or as a client user computer in a server-client user network environment, or as a peer computer system in a peer-to-peer (or distributed) network environment. Information handling system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, information handling system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

Information handling system 100 can include a disk drive unit and may include a computer-readable medium, not shown in FIG. 1, in which one or more sets of instructions, such as software, can be embedded. Further, the instructions may embody one or more of the methods or logic as described herein. In a particular embodiment, the instructions may reside completely, or at least partially, within system memory 104 or another memory included at information handling system 100, and/or within the processor 102 during execution by information handling system 100. The system memory 104 and the processor 102 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium.

Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other unless expressly specified otherwise. In addition, devices, modules, resources, or programs that are in communication with one another can communicate directly or indirectly through one or more intermediaries.

In an embodiment, BIOS 172 can be substantially compliant with one or more revisions of the Unified Extensible Firmware Interface (UEFI) specification. The UEFI standard replaces the antiquated personal computer BIOS system found in some older information handling systems. However, the term BIOS is often still used to refer to the system firmware. The UEFI specification provides standard interfaces and interoperability guidelines for devices that together make up an information handling system. In particular, the UEFI specification provides a standardized architecture and data structures to manage initialization and configuration of devices, booting of platform resources, and passing of control to the OS. The UEFI specification allows for the extension of platform firmware by loading UEFI driver and UEFI application images. For example, an original equipment manufacturer can include customized or proprietary images to provide enhanced control and management of information handling system 100. While the techniques disclosed herein are described in the context of a UEFI compliant system, one of skill will appreciate that aspects of the disclosed systems and methods can be implemented at substantially any information handling system having configurable firmware.

Maintenance of an information handling system may require recovery of the OS. Recovery of the OS repairs or restores the information handling system to an original factory condition. However, certain logistical challenges arise when remotely recovering the information handling system. For example there is a problem providing a remote rescue OS, also referred to as a service OS, that can support the various different models of information handling systems in the field. Currently, a custom service OS with device drivers and applications for each of the different models of the information handling systems is generated.

The current disclosure provides a single, smaller OS base image that supports the different models of the information handling systems. This smaller OS base image is updated with specific requirements for each particular model. Because the OS base image is smaller and can be used for the different models, only a single OS base image needs to be maintained resulting in tremendous space and cost savings. For example, instead of maintaining hundreds if not thousands of traditional OS images, only a single smaller OS base image that works with different models of information handling systems need be maintained. In addition, because of its size, smaller OS base image can be transmitted more quickly than the traditional OS images thus saving network bandwidth. Finally, because the current disclosure does not require the information handling system to have a persistent storage device like a hard disk drive (HDD), the current disclosure works even if the information handling system does not have a persistent storage device or has a corrupted persistent storage device.

Figure 2:
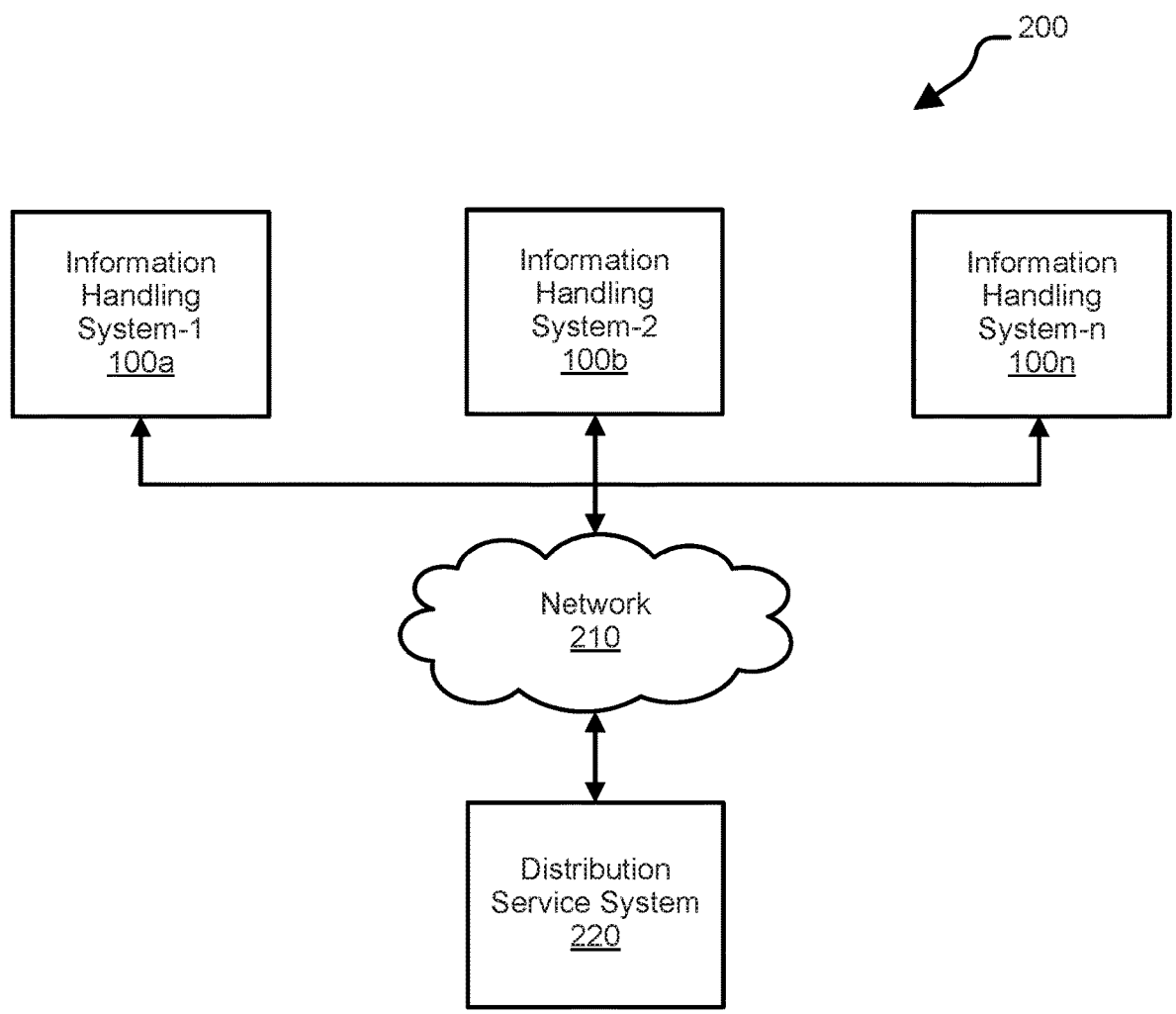
FIG. 2 is an example of an embodiment of a computer system, according to at least one embodiment of the present disclosure.

FIG. 2 shows a computer system 200 for pre-boot device driver provisioning for a remotely-staged OS. Computer system 200 includes a service OS distribution system 220 connected to information handling systems 100*a*-100*n* through a network 210.

Service OS distribution system 220 may be a web service configured to include, manage and maintain a data store or a library that contains service OS base images, device drivers, device driver packages, OS components, and/or applications. A device driver package may include one more device drivers. The service OS base image provides a building block for commonly selected OS and applications for use with commonly used components. Device drivers may constitute software that acts as an interface between hardware and the OS, application, or another higher-level program. Device drivers may communicate with the hardware over a communications bus and may receive calls from the application or higher-level program and issue commands to the hardware in response to the commands.

Service OS distribution system 220 may include one or more interconnected service OS distribution systems. Each of the interconnected service OS distribution systems may be resources included in an embodiment of the computer system 200 to provide service OS distribution services to, for example, information handling systems 100*a*-100*n*. Other embodiments of service OS distribution system 220 are possible and are intended to fall within the scope of the disclosure.

In this embodiment of computer system 200, the N information handling systems 100*a*-100*n* may access service OS distribution system 220, for example, in performing recovery operations through network 210. The processors included in information handling systems 100*a*-100*n* may be any one of a variety of proprietary or commercially available single or multi-processor system, such as an Intel-based processor, or another type of commercially available processor able to support traffic in accordance with each particular embodiment and application. Each of information handling systems 100*a*-100*n* and the service OS distribution system 220 may all be located at the same physical site or may be in different physical locations. One of information handling systems 100*a*-100*n* may issue a request to the service OS distribution system 220 for a rescue OS for a recovery operation. For example, a BIOS executing on one of information handling systems 100*a*-100*n* may send a request to service OS distribution system 220 to locate service OS base image and its drivers. Service OS distribution system 220 may interact with information handling systems 100a-100n to identify, locate, and download service OS base images along with one or more device drivers or driver packages. Service OS distribution system 220 may accept one or more parameters such as a service tag, manufacturer name, model name or identifier, etc. The server may use the parameter to identify and locate the service OS base image and device driver and/or device driver package.

Service OS distribution system 220 is connected to information handling system 100a via network 210. The connection allows the information handling system to perform serviceability and/or manageability operations. For example, the connection allows information handling system 100a to perform recovery tasks upon a boot failure by downloading a rescue OS from a web service such as service OS distribution system 220. Service OS distribution system 220 may be remotely accessed via an interface. For example, a user or a program may remotely access service OS distribution system 220. The user or program interaction via the interface may be managed through a server which may include a security subsystem or firewall to restrict unauthorized access. Service OS distribution system 220 may present information in the interface formatted for use by a web browser, such as hypertext markup language (HTML) pages.

Network 210 may use any one or more of a variety of networks or another type of communication connection as known to those skilled in the art. The type of communication connection used may vary with certain system parameters and requirements, such as those related to bandwidth and throughput required in accordance with a rate of data requests as may be issued by information handling systems 100a-100n. The communication connection may be a network connection, bus, and/or another type of data link, such as a hardwire connection, a network cable, wireless or WiFi® protocols, or other connections known in the art.

Figure 3:
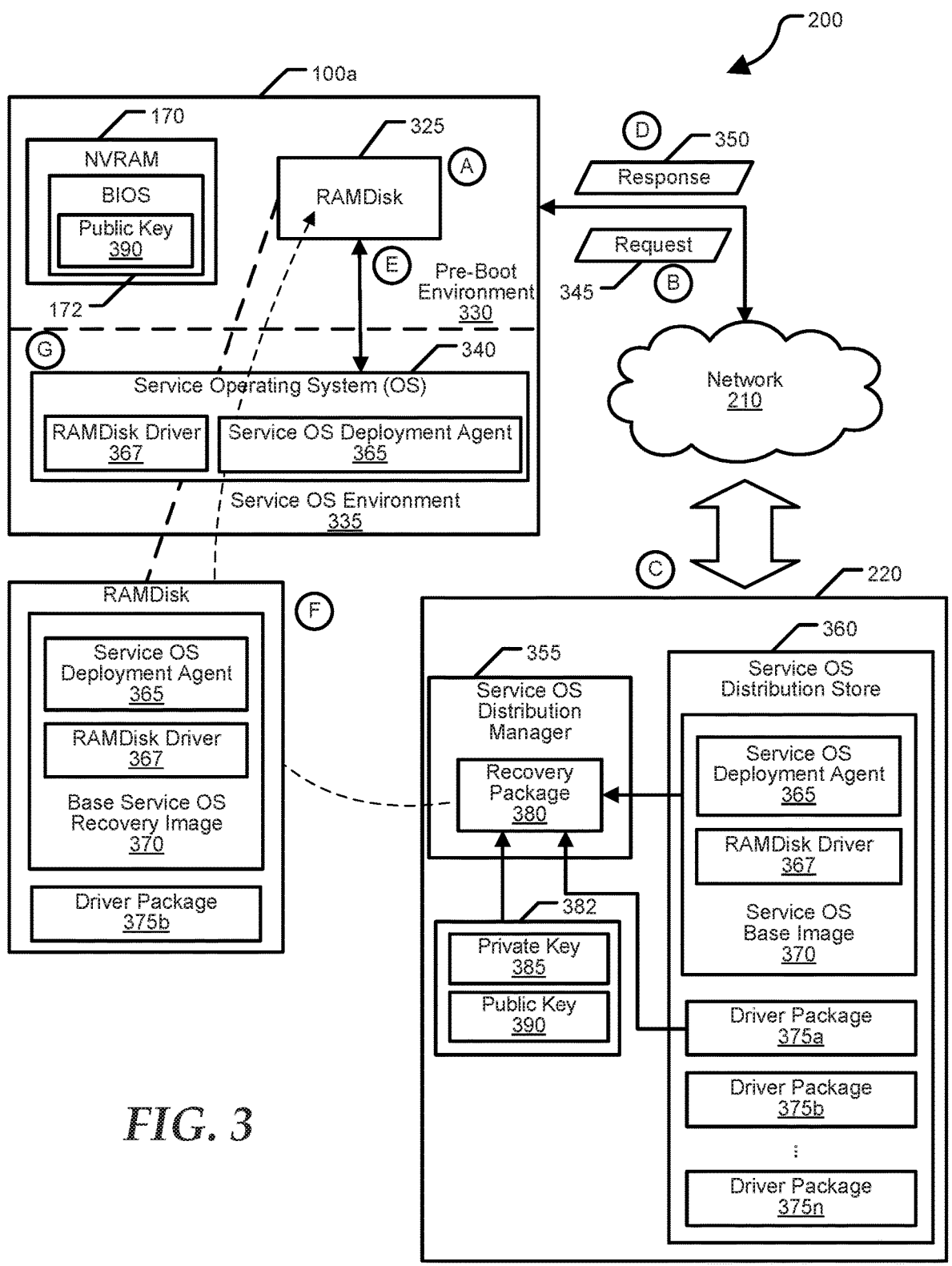
FIG. 3 is a more detailed illustration of the computer system, according to at least one embodiment of the present disclosure.

FIG. 3 shows computer system 200 in greater detail. Computer system 200 includes service OS distribution system 220 and information handling system 100a connected through network 210. Information handling system 100a includes a pre-boot environment 330 and a service OS environment 335. Pre-boot environment 330 includes NVRAM 170, BIOS 172, a public key 390, and a dynamic RAM disk (RAMDisk) 325. Service OS environment 335 includes service OS 340. Service OS distribution system 220 includes a service OS distribution manager 355, a service OS distribution store 360, and a secure vault 382. Service OS distribution store 360 includes device driver packages 375a-375n and service OS base image 370 which includes a RAMDisk driver 367 and a service OS deployment agent 365, hereinafter agent 365. Secure vault 382 includes a private key 385 and public key 390.

Information handling system 100a may be a bare-metal information handling system that has an OS that is not bootable. Information handling system 100a may be with or without a main storage such as an HDD or a solid-state drive (SDD). The HDD or the SDD may have been formatted or reformatted. The bare-metal information handling system 100a may also have no host OS to boot from such as may be provided from the factory or assembly plant with no host OS yet installed. A bare-metal information handling system may also be, for example, a decommissioned system in which all firmware and user data, applications and the host OS have been removed such as by a secure delete from the system drives.

For purposes of this disclosure, extensible firmware interface (EFI) and UEFI are used interchangeably and called UEFI for simplicity. Also, as used herein, legacy BIOS, as well as UEFI BIOS, are referred to as BIOS for simplicity. Pre-boot environment 330 may be configured with an interface (not shown) that allows information handling system 100a to have access to service OS distribution system 220 via network 210. In particular, BIOS 172, a UEFI module, or something similar in pre-boot environment may access service OS distribution system 220.

Service OS environment 335 represents the operating environment of information handling system 100a for performing the processing tasks that service OS 340 is configured to perform. In other words, service OS environment 335 represents a runtime environment wherein operation and control of information handling system 100a that is not managed by pre-boot environment 330. In addition, service OS environment 335 allows a service OS to repair or restore an information handling system to original factory settings. RAMDisk driver 367 is a virtual device driver communicates with the UEFI architecture in pre-boot environment 330 to identify and mount RAMDisk 325 during the OS boot process. Once mounted, agent 365 can locate and stage device drivers in RAMDisk 325 for provisioning by service OS 340.

Service OS distribution system 220 may be configured to store, identify and transmit service OS base image 370 and one or more of driver packages 375a-375n. In particular, service OS distribution store 360 may store various service OS images, device drivers, device driver packages, applications, OS components, etc. that may be used during the recovery operation of information handling systems such as information handling system 100a. The service OS images, device drivers, device driver packages, applications may be stored as compressed files, such as a ZIP file format. In addition, service OS distribution manager 355 may identify the service OS base image 370 and determine the device drivers for information handling system 100a. Service OS distribution manager 355 may use information associated with information handling system 100a included in a request 345 to determine the device drivers specific to information handling system 100a. For example, request 345 may include a service tag associated with information handling system 100a. Request 345 may include other information that service OS distribution system 220 may use to transmit a response 350 such as an internet protocol address, a media access control (MAC) address, etc.

In this example, service OS distribution store 360 stores a service OS base image 370 and driver packages 375a-375n. Service OS base image 370 does not contain a full OS and may be smaller in size than a typical rescue OS image. Service OS base image 370 may include code to boot information handling system 100a into a recovery stage. During the recovery stage, service OS 340 may update its device drivers using the device drivers in RAMDisk 325. Service OS 340 represents service OS base image 370 in the recovery stage or service OS stage.

Service OS base image 370 includes agent 365 and RAMDisk driver 367. Service OS base image 370 may have been modified to include a virtual device driver for RAMDisk 325. RAMDisk driver 367, may be configured to map or mount RAMDisk 325. Because RAMDisk 325 has been mounted to a particular location or virtual device path, agent 365 can now locate and access the various files, such as the device drivers, in RAMDisk 325 instead of a local storage such as the HDD or the SDD. Agent 365 may be configured to stage the device drivers for subsequent installation by service OS 340. RAMDisk Driver 367 uses UEFI variables set by pre-boot environment to locate RAMDisk 325 and mount it correctly. RAMDisk driver 367 may use various protocols to mount RAMDisk 325 such as virtual device protocol (VDP) or block I/O protocol. RAMDisk driver 367 mounts RAMDisk 325 to first available drive letter starting from Z.

Secure vault 382 represents a storage device that is configured to provide cryptographically secured information, including passwords, data, encryption keys, code, or other information that requires a high root of trust. In a particular embodiment, secure vault 382 represents security storage capacity that is in conformation with a Trusted Platform Module specification ISO/IEC 1189. Service OS distribution system 220 may sign response 350 and/or its contents such as recovery package 380 prior to transmission using private key 385. Information handling system 100a may use public key 390 to verify authenticity and integrity of response 350 and/or its contents. In particular, information handling system 100a may verify response 350 using a pinned public certificate before trusting the contents of response 350. The public key 390 may be packaged as part of BIOS in information handling system 100a. In addition to private key 385 and public key 390, secure vault 382 may include a white list. Whitelists may specify which of the service OS distribution systems are permitted to communicate with the information handling system.

For illustration purposes, information handling system 100a is referred to in the following paragraphs. However, it is understood that the current disclosure is not limited to information handling system 100a but instead is applicable to any one of information handling systems 100a-100n in FIG. 1. FIG. 3 is annotated with a series of letters A-G. The current disclosure also refers to an agent as performing functions. It is understood that the functionality may be performed by an application or the like that resides in information handling system 100a. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

Prior to stage A, information handling system 100a begins a sequence of initialization procedures also referred to as an initialization sequence. During the initialization sequence, information handling system 100a may detect a boot failure. Information handling system 100a may be placed into a service or recovery mode prior to initiating a connection to distribution system 220. The connection initiated may be an OOB network connection or an in-band network connection. The OOB network connection may be established using an OOB management controller. In another example, the OOB network connection may be established using an OOB network interface controller (NIC). The network connection to mobile device 120 may be initiated during a network boot such as a pre-boot execution (PXE) boot. The PXE boot is one of several network boot options, that allows the BIOS and a network interface card (NIC) to bootstrap a computer via the network. Other network boot options may be used instead of the PXE boot option such as a Hypertext Transfer Protocol (HTTP) boot option.

At stage A, after detecting the boot failure, information handling system 100a or in particular BIOS 172, may allocate a portion of a memory such as memory 104 to be used for storage of a recovery package 380. In another example, BIOS 172 may allocate the portion of the memory upon a subsequent reboot after detecting an initial boot failure. In yet another example, BIOS 172 may allocate the portion of the memory after power is turned on after power off of the initial boot failure. The portion of the memory allocated may be referred to as a dynamic memory disk or RAMDisk 325. BIOS 172 may use UEFI variables to store size and location of the RAMDisk 325, such as a start address. The size and location of RAMDisk 325 may also be stored in another data structure such as a BIOS table, advanced configuration, and power interface (ACPI) table, etc. RAMDisk 325 may be a portion of a volatile or non-volatile memory space such as NVRAM 170. The size of RAMDisk 325 may vary depending on the size of the memory. For example, RAMDisk 325 may be 500 MB on a system with 4 GB RAM memory. In another example, 2 GB could be allocated for RAMDisk 325 if the system has 16 GB of RAM. RAMDisk 325 may be a persistent storage in the pre-boot environment 330 and configured to be accessible by service OS environment 335 in the same boot session. In particular, RAMDisk 325 may be accessible by service OS 340 during the recovery stage.

At stage B, information handling system 100a may issue a command or request 345. In particular, the command may be issued during a phase in the initialization sequence such as during a pre-EFI initialization phase (PEI) or during a driver execution environment phase (DXE). In one example, request 345 may be an HTTP(S) GET/POST request structured as a RESTful/SOAP web service request. Request 345 may include name/value pairs and an identifier such as a service tag, a service code, serial number, etc. The service tag is an alphanumeric character code that is used to identify specific information regarding information handling system 100a. For example, the service tag may identify specific components and/or devices of information handling system 100a.

At stage C, service OS distribution manager 355 receives and processes request 345. When service OS distribution manager 355 receives request 345, it identifies service OS base image 370, device drivers or device driver package associated with information handling system 100a, such as driver package 375b, using the identifier included in request 345. Driver package 375b includes at least one device driver for a device or component in information handling system 100a.

At stage D, service OS distribution manager 355 transmits response 350 to information handling system 100a. Response 350 may be a HTTP response and may include information on how to download service OS base image 370, one of driver packages 375a-375n such as driver package 375b from service OS distribution store 360, and one of OS components. In another example, response 350 may include a payload, that is service OS base image 370 and one of driver packages 375a-375n such as driver package 375b. In yet another example, the payload may be recovery package 380. Recovery package 380 includes service OS base image 370 and one of driver packages 375a-375n such as driver package 375b. Response 350 may be a HTTP response or a HTTPS response. Because a compressed package may be faster to download and take up less disk space, service OS base image 370 and driver packages 375a-375n may be stored as compressed files. In another embodiment, service OS base image 370, driver packages 375a-375n, and/or recovery package 380 may be compressed prior to transmission with response 350 to reduce the size of the payload. Additionally, compression of recovery package 380 and/or can obfuscate the instructions making it harder to detect and analyze. In another embodiment, service OS base image 370 and driver package 375b may be compressed prior to their being combined to generate recovery package 380.

Prior to transmitting response 350, service OS distribution manager 355 generates a signature for responses to client requests using a private key. The private key is stored in the secure vault in Service OS distribution system 220. The public key for the private key is shared with all clients including pre-boot environment 330. The signature is packaged as a response header in response 350. The private, public key pair used in service OS distribution system 220 is a pinned certificate that clients may use to authenticate instances of response 350.

At stage E, information handling system 100a receives response 350. Information handling system 100a extracts signature from response 350 and verifies the signature using the public key corresponding to the private key (also referred to as the pinned certificate) that was used to sign the response pay load. If the verification passes, information handling system 100a continues with remaining steps. Otherwise the process is aborted. Information handling system 100a may parse response 350 and determine how to download service OS base image 370 and the device drivers. After determining how to download service OS base image 370 and the device drivers, information handling system 100a may download service OS base image 370, driver package 375b, and an OS component. In another embodiment, information handling system 100a may download the payload included in response 350. After the download, information handling system 100a may determine the authenticity of the files in the payload such as recovery package 380 and/or service OS base image 370 and driver package 375b prior to its storage in RAMDisk 325. Information handling system 100a may perform the integrity checks of downloaded files by matching SHA256 hash of downloaded file against the signature associated with the aforementioned files in response 350.

At stage F, after determining the authenticity of recovery package 380 and/or service OS base image 370 and driver package 375b, information handling system 100a may store recovery package 380 and/or service OS base image 370 and driver package 375b in RAMDisk 325. In particular, BIOS 172 may unpack recovery package 380 and/or service OS base image 370 and driver package 375b prior to storage. BIOS 172 may also separate recovery package 380 into service OS base image 370 and driver package 375b prior to storage. BIOS 172 may then store service OS base image 370 and driver package 375b in RAMDisk 325. The unpacking can continue until service OS base image 370 and driver package 375b are suitable for execution.

At stage G, information handling system 100a executes service OS base image 370. Service OS 340 represents service OS base image 370 during execution in service OS environment 335. During the execution of service OS 340, virtual device driver such as RAMDisk driver 367 is loaded. RAMDisk driver 367 mounts RAMDisk 325. RAMDisk driver 367, determines the size and location of RAMDisk 325 using the UEFI variables. During the boot-up of service OS 340, control of information handling system 100a may be transferred from BIOS 172 in pre-boot environment 330 to service OS 340 in service OS environment 335.

After the mounting of RAMDisk 325, agent 365 may start performing its various tasks such as locating the device drivers in the mounted RAMDisk 325 for installation by service OS 340. Because RAMDisk 325 has been mounted to a particular location or virtual device path, service OS 340 and agent 365 can access the various files in RAMDisk 325 such as the stored device drivers. During the installation of service OS 340, components of information handling system 100a are configured and enabled for operation. Service OS 340 provisions or installs the device drivers and/or activates OS components from the mounted RAMDisk 325 using the location or path determined by agent 365.

Figure 4:
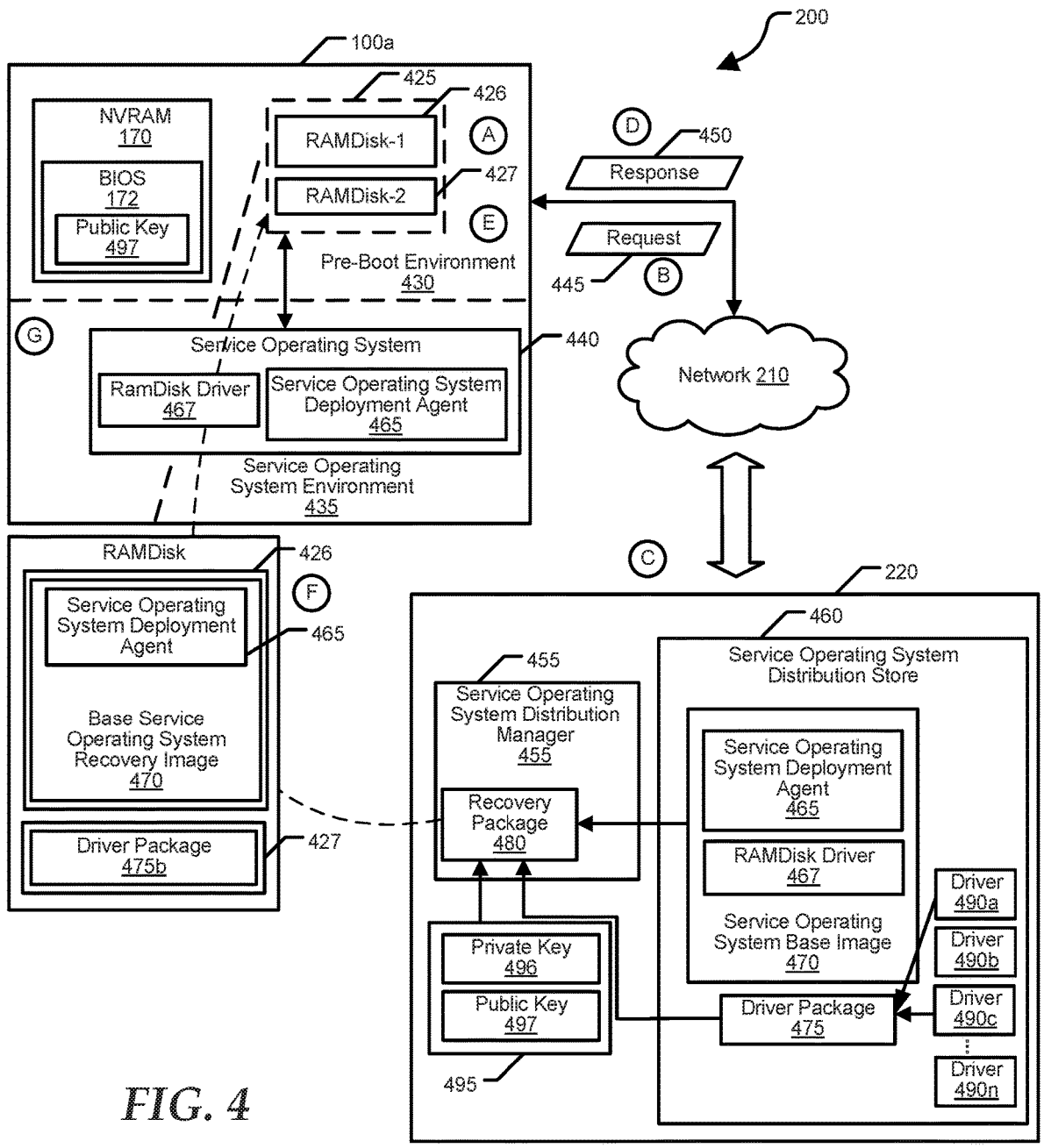
FIG. 4 is another detailed illustration of the computer system in a different scenario, according to at least one embodiment of the present disclosure.

FIG. 4 shows the computer system 200 in different scenario where multiple RAM disks are created in pre-boot environment. Computer system 200 includes service OS distribution system 220 and information handling system 100a connected through network 210. Information handling system 100a includes NVRAM 170, BIOS 172 and a RAMDisk 425 in a pre-boot environment 330. RAMDisk 425 includes a RAMDisk 426 and a RAMDisk 427. Information handling system 100a also includes a service OS 440 in a service OS environment 335. Service OS distribution system 220 includes a service OS distribution manager 455, a service OS distribution store 460, and a secure vault 495. Service OS distribution store 460 includes device drivers 490a-490n and service OS base image 370 which includes a RAMDisk driver 367 and a service OS deployment agent 465, hereinafter agent 465. Secure vault 495 may include a private key 496 and a public key 497.

Similar to service OS environment 335, service OS environment 435 represents the runtime environment of information handling system 100a for performing the processing tasks that service OS 440 is configured to perform. Service OS 440 includes a virtual device driver, RAMDisk driver 467 to identify and mount RAMDisk 425 during the OS boot process. Mounting RAMDisk 425 may include mounting RAMDisk 426 and RAMDisk 427. In another embodiment, the virtual device driver may mount RAMDisk 426 and RAMDisk 427 without mounting them as RAMDisk 425.

Service OS distribution system 220 may be configured to store, identify, and transmit service OS base image 470 and a driver package 475. Driver package 475 may include a device driver 490a and a device driver 490c. In particular, service OS distribution store 460 may store various OS images, OS base images, device drivers, OS components, applications, etc. that may be used during the recovery operation of information handling systems such as information handling system 100a. The OS images, the OS base images, the device drivers, the OS components, and the applications may be stored as compressed files such as a ZIP file format.

Service OS distribution manager 455 may identify the service OS base image 470 and determine the drivers for information handling system 100a based on an information included in a request 445, such as an identifier. After determining the device drivers, service OS distribution manager 355 may combine different device drivers to generate driver package 475. For example, request 445 may include a service tag associated with information handling system 100a. Using the service tag, service OS distribution manager 455 may determine the device drivers for information handling system 100a. For example, service OS distribution manager 455 may determine that device driver 490a and device driver 490c are associated with information handling system 100a. Service OS distribution manager 455 may combine device driver 490a and device driver 490c to generate driver package 475. Similar to request 345, request 445 may include other information that service OS distribution system 220 may use to transmit a response 450 such as an internet protocol address, a media access control (MAC) address, etc.

In this example, service OS distribution store 460 stores a service OS base image 370 and device drivers 490a-490n.

Service OS base image 470 does not contain a full OS and may be smaller in size than a typical rescue OS image. Service OS base image 470 may include code and/or instructions common to various information handling systems. Service OS base image 470 may include code to boot information handling system 100a into a recovery stage. During the recovery stage, service OS 440 may update its device drivers using the device drivers in RAMDisk 427. Service OS 440 represents service OS base image 470 in the recovery stage or service OS stage.

Service OS base image 470 may have been modified to include a virtual device driver, such as RAMDisk driver 467, for RAMDisk 425 and/or RAMDisk 426 and RAMDisk 427. Similar to agent 365, agent 465, may be configured to perform various tasks such as to map or mount RAMDisk 425 which includes RAMDisk 426 and RAMDisk 427. Because RAMDisk 425 has been mounted to a particular location or virtual device path, agent 465 can now locate and access the various files in RAMDisk 426 and RAMDisk 427 such as the device drivers. In another embodiment, the virtual device driver may mount RAMDisk 426 and RAMDisk 427 separately instead of mounting RAMDisk 425.

Similar to secure vault 382, secure vault 495 represents a storage device that is configured to provide cryptographically secured information, including passwords, data, encryption keys, code or other information that requires a high root of trust. Service OS distribution system 220 may sign response 450 and/or its contents such as recovery package 480 prior to transmission using private key 496. Information handling system 100a may use public key 497 to decrypt response 450 and/or its contents. In particular, information handling system 100a may verify response 450 using a pinned public certificate before trusting the contents of response 450. The pinned public certificate may include public key 497. The pinned certificate may be stored in a secure vault in information handling system 100a along with a copy of public key 497. In addition to private key 496 and public key 497, secure vault 495 may include a white list.

For illustration purposes, information handling system 100a is referred to in the following paragraphs. However, it is understood that the current disclosure is not limited to information handling system 100a but instead is applicable to any one of information handling systems 100a-100n in FIG. 1. Similar to FIG. 3, FIG. 4 is annotated with a series of letters A-G. Stages A-G of FIG. 4 is similar to stages A-G of FIG. 3. The current disclosure also refers to an agent as performing functions. It is understood that the functionality may be performed by an application or the like that resides in information handling system 100a. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

Prior to stage A, information handling system 100a begins a sequence of initialization procedures. During the initialization sequence, information handling system 100a may detect a boot failure. Information handling system 100a may be placed into a service or recovery mode prior to initiating the connection. At stage A, after detecting the boot failure, information handling system 100a or in particular BIOS 172, may allocate a portion of a memory such as memory 104 to be used for storage of recovery package 480. The allocated portion of the memory may be referred to as RAMDisk 425. RAMDisk 425 may be a portion of a volatile or non-volatile memory space such as NVRAM 170. In particular, RAMDisk 425 may be accessible by service OS 440 during the recovery stage. In another embodiment, BIOS 172 may allocate RAMDisk 426 and RAMDisk 427.

At stage B, information handling system 100a may issue a command or request 445 similar to request 345. Request 445 may include name/value pairs and an identifier such as a service tag, a service code, etc. that may be used to identify specific components and/or devices of information handling system 100a, such as device driver 490a and device driver 490c. At stage C, service OS distribution manager 455 receives and processes request 445. When service OS distribution manager 455 receives request 445, it identifies service OS base image 470 and device drivers associated with information handling system 100a, such as device driver 490a and device driver 490c.

At stage D, service OS distribution manager 455 transmits response 450 to information handling system 100a. Response 450 may include information on how to download service OS base image 470 and one or more of device drivers 490a-490n. In another example, response 450 may include a payload, that is service OS base image 470 and one or more of device drivers 490a-490n such as device driver 490a and device driver 490c. In yet another example, the payload may include service OS base image 470 and driver package 475, wherein driver package 475 may be a compressed file and includes device drivers 490 and device driver 490c. Finally, the payload may include recovery package 480. Recovery package 480 may be a compressed file that includes service OS base image 470 and driver package 475.

At stage E, information handling system 100a receives response 450. Information handling system 100a may parse response 450 and determine how to download service OS base image 470 and the device drivers. After determining how to download service OS base image 470 and the device drivers, information handling system 100a downloads service OS base image 470, device driver 490a and device driver 490c. In another embodiment, information handling system 100a may download service OS base image 470 and driver package 475. In yet another embodiment, information handling system may download recovery package 480 that includes service OS base image 470 and driver package 475 or device driver 490a and device driver 490c. In an alternative embodiment, information handling system 100, information handling system 100a downloads payload included in response 450 which contains the service OS base image 470 and the device drivers. After the download, information handling system 100a determines the authenticity of the downloaded files such as recovery package 480, service OS base image 370, driver package 475, or the device drivers 490a and 490c prior to their storage.

At stage F, after determining the authenticity of the files, information handling system 100a may store service OS base image 370 in RAMDisk 426 and driver package 475 or device driver 490a and device driver 490c in RAMDisk 427. In this example, RAMDisk 426 is larger than RAMDisk 427 as generally, service OS base images are larger than device drivers. For example, RAMDisk 426 maybe 500 MB while RAMDisk 427 is 100 MB. In particular, BIOS 172 may unpack the downloaded files prior to storage.

At stage G, information handling system 100a executes service OS base image 470. Subsequently, BIOS 172 may deallocate RAMDisk 426, that is the RAMDisk that stores the service OS base image 470, thus freeing up more memory space. Service OS 440 represents service OS base image 470 during execution in service OS environment 435. During the installation of service OS 440, components of information handling system 100a are configured and enabled for operation, wherein RAMDisk driver 467 loads and installs first.

RAMDisk driver 467 is a virtual device driver for mounting the RAMDisk. RAMDisk driver 467, determines the size and location of the RAMDisk that stores the device driver, RAMDisk 427 using UEFI variables. The UEFI variables include the location, such as start address, and size of RAMDisk 427. The location and size of RAMDisk 427 may also be stored in another data structure such as a BIOS table, ACPI table, etc. During the installation of service OS 440, control of information handling system 100a is transferred from BIOS 172 in pre-boot environment 430 to service OS 440 in service OS environment 435. After mounting of RAMDisk 427, agent 465 may start performing its various tasks such as locating the device drivers in the mounted RAMDisk 427 for installation by service OS 440 even if the service OS is remotely staged from the RAMDisk 427, that is located in service OS environment 435 which is remote from pre-boot environment 430. Service OS 440 continues installing device drivers from the mounted RAMDisk 427 until it's done with the recovery.

Figure 5:
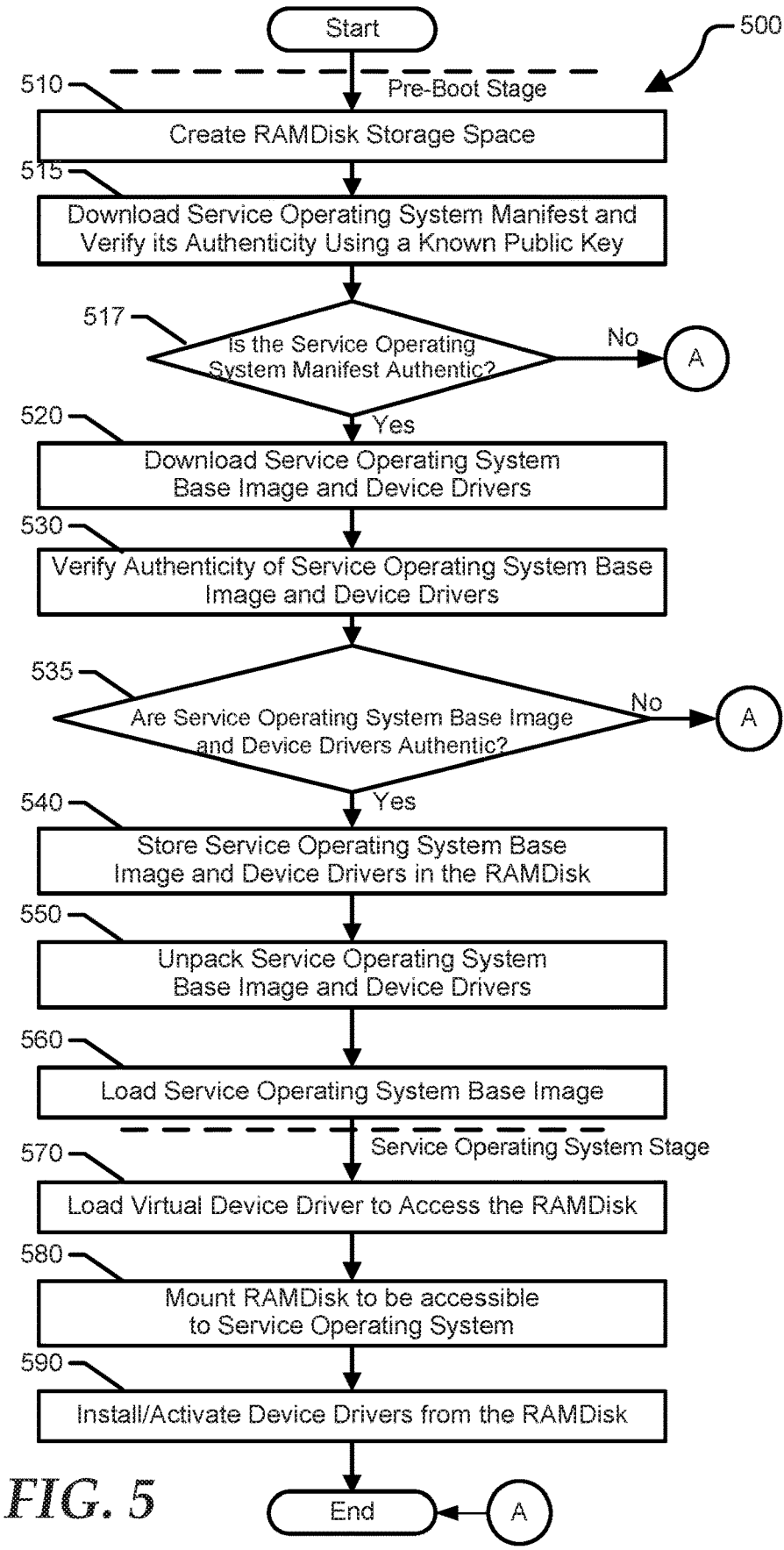
FIG. 5 is a flow chart showing a method for pre-boot device driver provisioning for a remotely-staged OS, according to an embodiment of the present disclosure.

FIG. 5 shows a method for pre-boot device driver provisioning for the remotely-staged OS. When the information handling system is started, the information handling system typically performs UEFI initialization sequence also referred to as a boot sequence. The initialization sequence includes several platform initialization phases such as a security (SEC) phase, the PEI phase, and the DXE phase, wherein each platform initialization phase has its own execution environment. Under normal circumstances, the initialization phase is successful and launches the OS such as a Windows® or Linux® OS. However, there are instances that the initialization fails and is unsuccessful in launching the OS. The OS and the BIOS may be configured to monitor and report successful or unsuccessful launching of the OS. For example, the Windows OS specification provides a Simple Boot Flag (SBF) register to allow the OS to notify the BIOS when a boot failure has occurred. During a subsequent unsuccessful boot sequence, the BIOS can access the SBF register. If the BIOS determines that a prior initialization has failed, the BIOS may start an OS recovery operation. In one exemplary embodiment, the disclosed system and methods may be implemented to perform the OS recovery operation. During the OS recovery operation, the BIOS communicates with a backend cloud system. The BIOS may communicate to the backend cloud system using various means such as JSON over HTTPS as a data transfer protocol.

After the initial boot failure, the method begins at the pre-boot stage at block 510, the BIOS creates a RAMDisk storage space. The RAMDisk may be a volatile or non-volatile memory storage such as embedded and partitioned flash memory, electrically erasable programmable read-only memory (EEPROM), other types of NVRAM that is configured to store information for the recovery base image and the device drivers. For example, the RAMDisk storage space may be created by allocating a portion of the system memory RAM (SMRAM). In particular, the portion of the SMRAM may be allocated by calling the function EFI ALLOCATE POOL. In another embodiment, the BIOS creates a plurality of RAMDisks. For example, the BIOS allocates two portions of the SMRAM, thus creating two RAMDisks. A first RAMDisk is used to store the recovery base image and a second RAMDisk is used to store the device drivers and other files. The method proceeds to block 515.

At block 515, the BIOS sends a request to a cloud distribution system to retrieve a service OS base image and device drivers. The cloud distribution system may respond to the request using HTTP or HTTPS. In one embodiment, the cloud distribution system provides information to the BIOS on how to download the recovery OS also referred to as the service OS base image and device drivers. For example, the information may provide the name, size, file path, URL, format of the files to be downloaded, and the download type. The aforementioned information may be included in a system manifest. The system manifest includes information regarding the location of the recovery package and/or the recovery base image and the device drivers. In addition, a checksum value to verify the authenticity of the files may also be provided in a manifest response from cloud distribution system. In one embodiment, the response (also known as the system manifest) includes a payload containing the service OS base image and the device driver URLs along with their signature and size information. The method then proceeds to decision block 517. At decision block 517, the BIOS then determines whether the system manifest is authentic. If the system manifest is authentic, then the device path and the signatures of the recovery package and/or the recovery base image and device drivers provided in the system manifest are trusted. The method then proceeds to block 520. Otherwise the system manifest is determined to not be authentic, the method terminates.

At block 520, information handling system parses the contents of the response to create the system manifest. Then the information handling system downloads the service OS base image and the device drivers. The method then proceeds to block 530. At block 530, the BIOS verifies the integrity or authenticity of downloaded files by matching their SHA256 hash against the checksum returned for each file in system manifest. The method proceeds to decision block 535. At decision block 535, if the service OS base image and the device drivers are determined to pass integrity checks, then the method proceeds to block 540. Otherwise, the service OS base image and the device drivers are determined to be not authentic, and the process will be aborted.

At block 540, the BIOS stores the service OS base image and the device drivers in the RAMDisk. In another embodiment, the BIOS may store the service OS base image in one RAMDisk and the device drivers in another RAMDisk. After storing the service OS base image and the device drivers, the method proceeds to block 550. At block 550, the BIOS unpacks the service OS base image and the device drivers. The unpacked content is stored in RAM disk in format that the OS run time expects. The method then proceeds to block 560.

At block 560, the BIOS loads the service OS base image. In particular, the OS loader loads and executes the service OS base image. The service OS base image may have been modified to include a custom virtual device driver which is used to identify and mount the RAMDisk using UEFI variables. The UEFI variables include the start address and size of the memory allocated for the RAMDisk. The service OS base image may have also been modified to include a service OS deployment agent which is used to perform various tasks such as to locate and identify the device drivers in the RAMDisk. The method proceeds in the service OS stage to block 570.

At block 570, the method enters the service OS stage and the service OS loads the virtual device driver to access the RAMDisk. Generally, when service OS loader loads enough of its own environment to take control of the system's continued operation and then terminates boot services. Typically, memory in the pre-boot environment would generally be deallocated. However, because of the modification of the service OS base image in the current disclosure, RAMDisk created in pre-boot is preserved when control is passed from pre-boot to OS environment. Service OS is aware of the preserved RAMDisk. The method then proceeds to block 580.

At block 580, the virtual device driver mounts the RAMDisk to be accessible to the service OS in the recovery environment. Mounting the pre-boot created RAMDisk may also represent mapping the RAMDisk as a file system drive visible to Service OS processes. The service OS deployment agent then enumerates and stages the device drivers in the RAMDisk. Staging is the process of adding the device drivers to OS driver store. During staging, the driver files may be verified, copied to the driver store and indexed for quick retrieval. The method then proceeds to block 590.

At block 590, the service OS deployment agent may direct the service OS to the location of the device drivers. The service OS deployment agent may determine the devices in the information handling system and installs the driver for each device. The service OS system configuration may have been modified to first look for the device drivers in the RAMDisk instead of a local storage device. The service OS installs the device drivers by binding the device drivers to their respective devices. Device binding is the process of associating a device with a device driver that can control it.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method for recovery of an information handling system, the method comprising:
    allocating a dynamic memory disk, wherein the dynamic memory disk is located in a pre-boot environment, and wherein the dynamic memory disk is accessible in the pre-boot environment and in an operating system runtime environment;
    transmitting a request to a distribution system for an operating system base image and a device driver, wherein the request to the distribution system includes an identifier of the information handling system;
    receiving a response from the distribution system, the response including instructions on how to download the operating system base image and the device driver associated with the identifier of the information handling system, wherein the operating system base image is modified to include a virtual device driver and an operating system deployment agent;
    verifying the response using a pinned public certificate prior to downloading the operating system base image and the device driver;
    downloading the operating system base image and the device driver based on the instructions;
    storing the operating system base image and the device driver in the dynamic memory disk;
    loading the operating system base image, including booting an operating system in the operating system runtime environment;
    subsequent to loading the operating system base image, mounting the dynamic memory disk by the virtual device driver;
    staging the device driver, including locating the device driver stored in the dynamic memory disk; and
    installing the device driver by the operating system.

2. The method of claim 1, further comprising subsequent to the downloading of the operating system base image and the device driver, verifying authenticity of the operating system base image and the device driver.

3. The method of claim 2, wherein the verifying the authenticity of the operating system base image and the device driver is based on a signature.

4. The method of claim 1, further comprising determining, by the distribution system, the operating system base image and the device driver associated with the information handling system in the response using the identifier of the information handling system.

5. The method of claim 1, wherein the device driver is included in a device driver package.

6. The method of claim 1, wherein the distribution system is located in a cloud.

7. The method of claim 1, wherein the mounting of the dynamic memory disk includes locating the dynamic memory disk based on Unified Extensible Firmware Interface variables.

8. The method of claim 1, wherein the request to the distribution system is transmitted using JavaScript Object Notation over Hypertext Transfer Protocol as a data transfer protocol.

9. A method for recovery of an information handling system, the method comprising:
    allocating a first dynamic memory disk and a second dynamic memory disk, wherein the first dynamic memory disk and the second dynamic memory disk are located in a pre-boot environment and accessible in an operating system runtime environment;
    transmitting a request to a distribution system for an operating system base image and a device driver;
    receiving a response from the distribution system, the response including instructions on downloading the operating system base image and the device driver;
    downloading the operating system base image and the device driver based on the instructions, wherein the operating system base image is modified to include a virtual device driver and an operating system deployment agent;
    storing the operating system base image in the first dynamic memory disk and the device driver in the second dynamic memory disk;

loading the operating system base image, including installing an operating system in the operating system runtime environment;

subsequent to the loading of the operating system base image, mounting the second dynamic memory disk by the virtual device driver;

staging the device driver, including locating the device driver stored in the second dynamic memory disk; and installing the device driver by the operating system.

10. The method of claim 9, further comprising subsequent to the loading of the operating system base image, deallocating the first dynamic memory disk.

11. The method of claim 9, wherein the request to the distribution system includes an identifier of the information handling system.

12. The method of claim 11, further comprising determining the operating system base image and the device driver based on the identifier.

13. An information handling system comprising:

a dynamic memory disk to store an operating system base image and a device driver for a recovery boot process of the information handling system, wherein the dynamic memory disk is located in a pre-boot environment and is accessible in a runtime environment; and a central processing unit to load the operating system base image and to execute the recovery boot process, which causes the central processing unit to:

transmit a request to a distribution system for an operation system base image and the device driver, wherein the request includes an identifier of the information handling system;

receive a response from the distribution system, the response including instructions on how to download the operating system base image and the device driver associated with the identifier of the information handling system, wherein the operating system base image is modified to include a virtual device driver and an operating system deployment agent;

verify the response using a pinned public certificate prior to downloading the operating system base image and the device driver;

download the operating system base image and the device driver based on the instructions;

store the operating system base image and the device driver in the dynamic memory disk;

load the operating system base image, wherein the operating system base image is in the runtime environment;

mount the dynamic memory disk by the virtual device driver subsequent to the load of the operating system base image;

stage the device driver by the operating system deployment agent, wherein the staging of the device driver includes locating the device driver stored in the dynamic memory disk; and install the device driver by an operating system.

14. The information handling system of claim 13, wherein the dynamic memory disk is allocated from a system memory.

15. The information handling system of claim 13, wherein the dynamic memory disk is allocated during a subsequent initialization process after a boot failure.

16. The information handling system of claim 13, wherein the dynamic memory disk is allocated using location and size stored in Unified Extensible Firmware Interface variables.

17. The information handling system of claim 13, wherein the operating system base image and the device driver are downloaded from a cloud distribution system.

18. The information handling system of claim 13, wherein the operating system base image and the device driver are downloaded based on instructions from a cloud distribution system.

19. The information handling system of claim 13, wherein the operating system base image supports different models of the information handling system.

20. The information handling system of claim 13, wherein the device driver is specific to the information handling system.

* * * * *